Feb. 8, 1949.  C. A. GILSON  2,461,377
ROTARY INTERNAL-COMBUSTION ENGINE
Filed March 21, 1945  2 Sheets-Sheet 1

Inventor
C. A. Gilson
By Kimmel & Crowell
Attorneys

Feb. 8, 1949.   C. A. GILSON   2,461,377
ROTARY INTERNAL-COMBUSTION ENGINE
Filed March 21, 1945   2 Sheets-Sheet 2

Inventor
C. A. Gilson
By Kimmel & Crowell Attorneys

Patented Feb. 8, 1949

2,461,377

UNITED STATES PATENT OFFICE 2,461,377

ROTARY INTERNAL-COMBUSTION ENGINE

Clair A. Gilson, Stuart, Fla.

Application March 21, 1945, Serial No. 583,889

5 Claims. (Cl. 123—16)

This invention relates to improvements in rotary internal combustion engines and has for an object thereof the provision in a rotary engine a plurality of vanes either one or a plurality of which are transmitting power throughout a greater portion of the diameter of its cylinder.

Another object of the invention is to provide an internal combustion engine which will exhaust at atmospheric pressure without noise.

A further object of the invention is to provide an internal combustion engine in which approximately 100% of the energy of the explosion is utilized.

A still further object of the invention is to provide an internal combustion engine which will operate efficiently under wide variations of load and atmospheric pressure.

Another object of the invention is to provide in an internal combustion engine the combination of a power unit and a compression unit formed in one casting, and both operating upon substantially the same principle.

Another object of the invention is to provide an internal combustion engine embracing a pair of similarly formed and similarly operated rotors of different diameters and preferably in a single casting or body forming two units, one being a compressor and the other a power unit.

A further object of the invention is to provide an internal combustion engine including means whereby the combustible fuel will be permitted to expand to atmospheric pressure before being exhausted to atmosphere.

With the above and such other objects in view as may hereinafter more fully appear, I have invented the device shown in the accompanying drawings, in which:

Figure 3 is an enlarged sectional detail of a vane and shoe connection.

Figure 4 is a detail view of a check valve.

Figure 1:
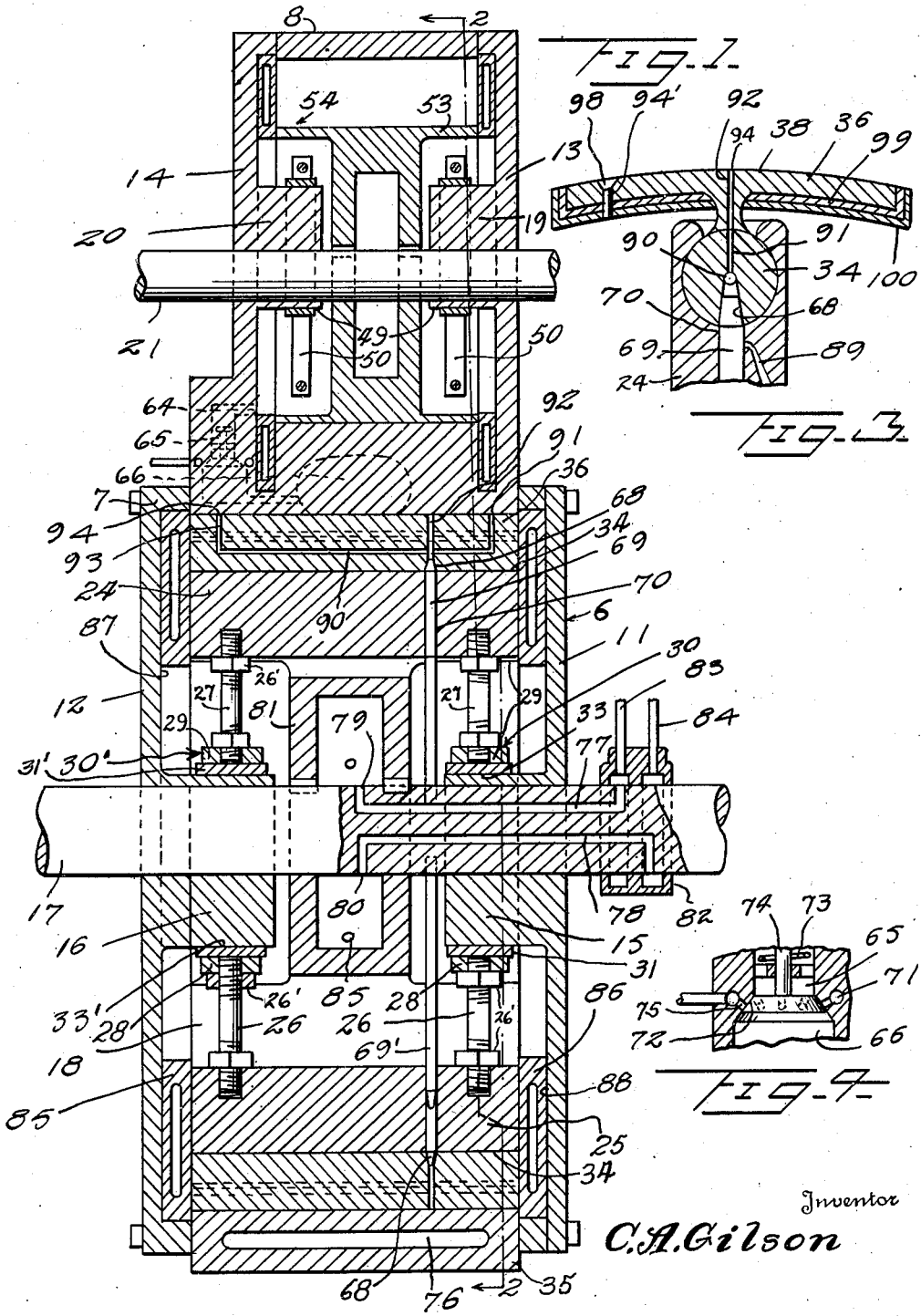
Figure 1 is a vertical sectional view of the engine.

Like reference characters indicate like parts throughout the following specification, and in the several views in the drawings in which 6 indicates my improved internal combustion engine comprising housings 7 and 8 preferably formed in a single casting. Bored through these housings is a power cylinder 9 and a compressor cylinder 10, which is of lesser diameter than cylinder 9. The sides of cylinder 9 are closed by face plates 11 and 12 and the sides of cylinder 10 are closed by similar plates 13 and 14. The members 11 and 12 are provided with integral, inwardly extending aligned eccentric cam bosses 15 and 16 respectively eccentric with respect to the shaft 17 and axis of rotation thereof, but concentric to the housing 7, bore thereof and face plates 11 and 12 and of corresponding increasing thickness and radius from top to the bottom at each side, and which bosses form bearings for a shaft 17, driven by a rotor 18, fixed thereto. Shaft 17 is therefore eccentrically mounted with respect to the bore of cylinder 9 and with respect to the concentric cam bosses 15 and 16 which are of slightly increasing radius or thickness from the top to the bottom thereof and eccentric to shaft 17 and center axis of rotation thereof and to rotor 18. The inner faces of plates 13 and 14 are also provided with cam bosses 19 and 20 which form bearings for a shaft 21.

The rotor 18 is provided with inwardly projecting slideways 22 and 23, in which vanes 24 and 25 are slidably mounted by right and left hand threaded adjusting bolts 26 and 27, the inner ends of which are threaded into the plates 28 and 29 of the yokes 30 and 30', which are slidably mounted upon slide blocks 31 and 31', which in turn are rotatably mounted upon the peripheries 32" of cams 15 and 16, respectively, through their central bores 33 and 33'. The position of the vanes 24 and 25 relative to the yokes 30 and 30' may be adjusted for wear, by the bolts 26 and 27 on each of which is provided lock nuts 26'. Connected to the outer end of each vane 24 and 25 by means of a flexible type transverse pivot connection 34 for pivoting or rocking movement circumferentially of the rotor 18, are shoes 36 and 35, the outer faces 37 and 38 of which are curved to the arc of the wall 39 of the bore 9, whereby the shoes at all times closely contact said wall 39 and pivot circumferentially.

In order to protect the shoes from excessive heat, insulating material 99 and heat resisting metal 100 (Figure 3) cover the inner faces and each edge of the shoes.

Seated in the recess 40 formed in the housing 7, is a block 41, the face 42 of which is arcuate to conform to the arc of the peripheral diameter of the face 32" of rotor 18, and is adapted to maintain a gas tight contact with the rotor. Upon wear the block 41 may be adjusted by means of adjusting screws 41'.

Figure 2:
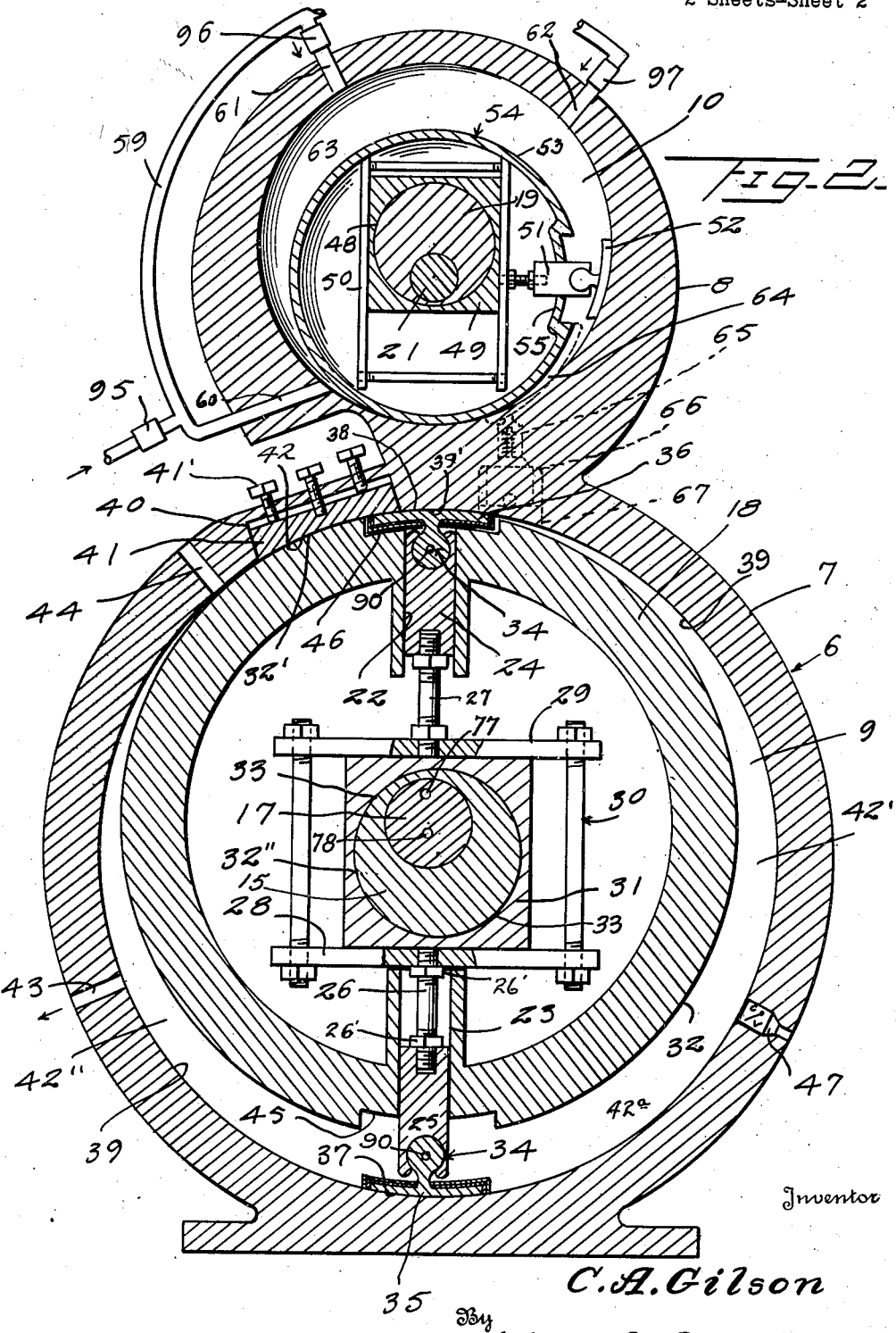
Figure 2 is a section on line 2—2 of Figure 1.

The rotor 18 is so eccentrically mounted in its housing 7 that the uppermost part 32' of its periphery is always in contact with the top portion 39' of the surface 39, and the cams 15 and 16 are so arranged that as one vane goes up or movement toward the top or surface 39' of the bore 39 of housing 7 it is gradually drawn into its slideway and the other vane is gradually pushed out at the bottom whereby the shoes 35 and 36 are always kept in contact with the surface 39 of the enlarged nearly circular bore 9. That is, measuring the bore of the cylinder from top to the bottom as seen in Figure 2, the radial dimension from the center of the vertical and horizontal axes, the radius increases for a certain arc on each side and then decreases back to the original vertical dimension as measured at the bottom of the vertical axis. Due to the eccentric mounting of the rotor 18 in the cylinder bore 9, a crescent shaped space 42ᵃ is provided between the rotor and cylinder wall in the lower portion of the cylinder.

The space 42ᵃ is divided into a pressure chamber 42' and an exhaust chamber 42" through the latter of which gradually expanding exhaust gases will be forced from the cylinder through the exhaust ports 43 and 44. As the vanes 24 and 25 are retracted on their upward movement their shoes 35 and 36 will take seat within the recesses 45 and 46 provided in the periphery of the rotor. In case the engine is operating at less than maximum power the pressure of the expanding heated gas in chamber 42' might fall below atmospheric pressure causing loss of power; to avoid this one or more check valves 47 are placed in ports in the housing through which air may enter and prevent the pressure of the expanding gas from falling below atmospheric pressure.

The construction of the compression unit is similar to that of the power unit and in which is provided the cam bearings 19 and 20 with peripheries 48 eccentric to the shaft for the shaft 21, slide blocks 49, yokes 50, a vane 51 and shoe 52, the vane operating through the periphery 53 of the rotor 54 and vane 25 respectively, so that vanes 24 and 25 of rotor 18 shift in opposite directions radially on pins 69 and 69' respectively, said peripheral portion 53 being set in at one point of the rotor to provide the pocket 55 to receive the shoe upon its retrograde movement. In this case only one vane is necessary. A manifold 59 provides check valved ports for combustible fuel through which ports 60, 61 and 62 to the cylinder space 63 between the rotor 54, and cylinder, the gas passes. When the port 60 is open and is passed by the vane 51, said vane starts compressing the fuel and continues the pressure thereof until the complete charge is passed through the passage 64, through the valve chamber 65 into the relatively very small combustion chamber 66, the bottom 67 of which opens into cylinder 9 of the power unit, but at the moment of highest compression the upper shoe 36 is holding said bottom closed. In order that shoe closing the combustion chamber is in exact position to completely close the chamber 66, I provide, in each shoe 35 and 36, a recess 68 to receive a pin 69 or 69' which are fixed to shaft 17 and each of which slidably operates through a bore 70 in the vane 24 and vane 25 respectively, so that vanes 24 and 25 of rotor 18 shift in opposite directions radially on pins 69 and 69' respectively, the inner end of the pin being carried by the shaft 17 to which it is fixed.

As the upper vane is retracted to its extreme inner position, the pin 69 or 69' projects through the vane and into the recess in the tongue or ball of the shoe to hold it rigid and locked against pivoting or rocking movement circumferentially of the rotor 18 when retracted or moved within the periphery of the rotor, and in close contact with said bottom. As the shoe passes from under said bottom, the highly compressed explosion charge escapes into chamber 42' and presses the shoe and vane down to turn the rotor. Through the crescent shape of the chamber 42' the charge is gradually expanding and thus continuing pressure upon the vane until exhaust port 43 is reached. During this action the lower vane and shoe is driving out through ports 43 and 44 what remains of the last exhausted explosive gases. It is to be noted that the rotor 54 is eccentrically mounted in cylinder 10 in position reverse that of the rotor of cylinder 9, that is the peripheral surface engages the lower wall of cylinder 10, thus the entire space 63 is a compression chamber for the system.

As the vane 51 compresses and discharges its fuel into the chamber 66, fuel oil is being fed through an oil system (not shown) to a tubular passage 71 encircling the valve seat 72 of said chamber 66, and when the valve spring 73 of valve 74 is overcome by the compressed air from the compression unit, the valve drops, permitting oil to be sprayed through an encircling series of jets 75 leading from the passage 71, which oil will be sheared and vaporized with the said compressed air from the compression unit, all of which fuel will be ignited through the high compression of said mixture.

While in the accompanying drawings I show only two vanes carried by rotor 18, and only one by rotor 54, this number may be increased in each case to meet specific requirements. In Figure 1 of the drawings I show a water jacket cooling system 76 and I also provide bores 77 and 78 in the shaft 17, having openings 79 and 80 into the hollow hub 81 of the rotor 18 fixed to shaft 21. A collar 82 on the shaft 17 outwardly of the plate 11, is provided with inlet and outlet points 83 and 84 to said bores 77 and 78 for circulation of a cooling fluid into the hub of the rotor.

Packing rings 85 and 86 of greater diameter than that of the rotor are seated in recesses 87 and 88 in the plates 11 and 12 and are formed hollow for the circulation of the cooling fluid.

Oil passages 89 in the vanes admit lubricating oil into the bores 70, when the pins 69 pass inwardly of said passages and on the reverse movement said pins force the oil through bores 90, 91, 92 and 93 in the shoes, and to the outer surface thereof through outlets 94.

When the engine is running, pressure on the opposite sides of the shoes will be unequal, but unequal wear can be overcome by having a lengthwise groove 98 in the face of the shoe connected with one or more of the holes 94'.

With both rotors turning in a clockwise direction, rotor 54 at twice the revolutions per minute of rotor 18, the operation of the engine would be as follows: With the explosive gas mixture from the carburetor being compressed into the space ahead of vane 51, as the rotor continues to turn the gas will be forced through the slot 64, through chamber 65, check valve 72, into explosive chamber 66. At the time the upper vane of the power unit will move to the explosion chamber at which time ignition of the charge of gas will occur. The ignited charge will then be confined in the power unit above the vane and shoe, the pressure against the latter members will turn the rotor 18 in a clockwise direction. As the rotor continues to turn, the gas above the vane will expand until the vane and shoe passes the exhaust port 43, the exhaust gas being forced out both ports 43 and 44.

My internal combustion engine will operate efficiently under wide variation of load and atmospheric pressure. The inlet to the manifold 58 from the carburetor being fitted with the throttle valve 95, and the manifold being connected with a plurality of openings 61 and 62 into the cylinder 10, which openings are controlled by gas tight valves 96 and 97. To operate the engine at slow speed the valves 96 and 97 should be opened and the throttle valve 95 nearly closed. To increase the speed and power the throttle valve should be fully opened. A further increase in power and speed would be obtained by closing valve 97, and maximum speed and power would be obtained by closing valve 96, and other like valves.

When valves 96 and 97 are open, the gas will by-pass the shoe 51, but when these valves are closed, the maximum charge of gas will be compressed and forced into the explosion chamber. This arrangement permits the compression of the required amount of gas without having to work against a partial vacuum which would be the case if only the throttle valve were used to control the speed. Also the compressor would deliver the maximum charge of gas that could be used at high altitude without a supercharger.

Another advantage of the engine is that it will expand the heated gas to atmospheric pressure before the gas is exhausted. It is apparent that when the engine is operating at less than maximum power, the pressure of the expanding gas might fall below atmospheric pressure causing loss of power. In order to avoid this, one or more check valves 47 are provided into the pressure chamber 42' through which atmospheric air will be allowed to enter and prevent the expanding gas from falling below atmospheric pressure. Therefore, the engine will operate at high altitudes and exhaust quietly into the low atmospheric pressure.

I claim:

1. In a rotary engine, a substantially annular housing, inwardly extending cam bosses fixed to the ends of said housing concentric therewith, a shaft extending through bosses eccentric thereto, a rotor fixed to said shaft concentric with said shaft and eccentric to said housing, shoes engaging the inner surface of said housing, a slide block rotatable about said cam boss, vanes slidably mounted on said rotor, means rockably securing said shoes on said vanes, and means fixed on said shaft slidable in said vanes and engaging said shoe securing means in certain positions of said rotor and said shoes for locking said shoes against rocking movement on said vanes.

2. A rotary engine comprising a substantially annular housing, cam bosses fixed to the ends of said housing concentric therewith, a shaft rotatably mounted through said bosses eccentric thereto, a rotor within said housing fixed to said shaft concentric with said shaft and eccentric to said housing, slide blocks rotatable about said cam bosses, vanes slidable in said rotor and slidably engaging said slide blocks, shoes rockably secured to said vanes, said shoes slidable on the inner surface of said housing, and a pin fixed on said shaft slidable in said vanes engageable with said shoes in certain positions of said rotor for holding said shoes against rocking on said vanes.

3. A rotary engine comprising a substantially annular housing, cam bosses fixed to the ends of said housing, a shaft rotatably mounted through said bosses eccentric thereto, a rotor fixed to said shaft concentric therewith, slide blocks rotatable about said cams, a yoke slidable on said slide blocks, inwardly projecting slideways on said rotor, vanes slidable in said slideways and fixed on said yoke, shoes rockably secured to said vanes slidably engaging said housing, a pin fixed on said shaft engageable with said shoes for locking said shoes against rocking, a combustion and exhaust chamber in said housing on opposite sides of said vanes, said housing formed with an opening communicating with said combustion chamber, and a check valve in said opening for admitting air at atmospheric pressure when the pressure in said combustion chamber falls below atmospheric pressure.

4. In a rotary internal combustion engine, a substantially annular housing having a bore, the radial dimension of which from the center of the vertical and horizontal axes increases for a certain arc on each side and then decreases back to the original vertical dimension when measured at the bottom of the vertical axis from top to bottom, inwardly extending concentric circular cams at the ends of the housing, a shaft extending axially through the housing and eccentrically through the cams, a circular rotor concentrically fixed to the shaft for rotation with the shaft and eccentrically and rotatably mounted relative to the cams within the housing, slide blocks rotatable about said cams, vanes slidably mounted radially of the rotor and adjustably connected to the blocks, shoes pivoted on the vanes for rocking movement circumferentially and adapted to be seated in the periphery of the rotor to engage the interior of the housing, means carried by the shaft and slidably engaged by the vanes to engage the shoes in retracted seating positions thereof to hold the shoes rigid with the vanes, and circular rings within the ends of the housing and engaging the ends of the rotor and vanes.

5. In a rotary internal combustion engine, a nearly circular housing having a bore, the radial dimension of which from the center of the vertical or horizontal axis increases for a certain arc on each side and then decreases back to the original vertical dimension when measured at the bottom of the vertical axis from top to bottom, inwardly extending concentric circular cams at the ends of the housing, a shaft extending axially through the housing and eccentrically through the cams, a circular rotor concentrically fixed to the shaft for rotation with the shaft and eccentrically and rotatably mounted on and relative to the cams within the housing, slide blocks rotatable about said cams, vanes slidably mounted radially of the rotor and adjustably connected to the blocks, shoes pivoted on the vanes and seated in the periphery of the rotor to engage the interior of the housing, radial pins on the shaft and on which the vanes and shoes are radially slidable to engage and secure the shoes against pivoting in one position of rotation of the rotor when the shoes are moved within the periphery of the rotor, and circular rings within the ends of the housing and engaging the ends of the rotor and vanes.

CLAIR A. GILSON.

REFERENCES CITED

The following references are of record in the file of this patent:

UNITED STATES PATENTS

| Number | Name | Date |
|---|---|---|
| 231,520 | Barrow | Aug. 24, 1880 |
| 280,027 | Garcelon | June 26, 1883 |
| 552,854 | Morse | Jan. 7, 1896 |
| 688,947 | Guindon | Dec. 17, 1901 |
| 904,974 | Lee | Nov. 24, 1908 |
| 909,685 | Schaefer | Jan. 12, 1909 |
| 1,228,806 | Morris | June 5, 1917 |
| 1,358,450 | Kawate | Nov. 9, 1920 |
| 1,427,692 | Mahon | Aug. 29, 1922 |
| 1,442,198 | Utley | Jan. 16, 1923 |
| 1,670,953 | Browne | May 22, 1928 |
| 1,748,568 | Grover | Feb. 25, 1930 |
| 1,757,484 | Shoemaker | Mar. 6, 1930 |
| 1,808,084 | Tidd | June 2, 1931 |
| 1,857,931 | Axien | Mar. 10, 1932 |

FOREIGN PATENTS

| Number | Country | Date |
|---|---|---|
| 172,663 | Great Britain | Dec. 22, 1921 |